(12) United States Patent
Chrivia et al.

(10) Patent No.: US 9,744,496 B1
(45) Date of Patent: Aug. 29, 2017

(54) METHOD FOR CONTROLLING AN ADSORPTION DRYER FOR THE TREATMENT OF COMPRESSED GAS

(71) Applicant: BEKO Technologies GmbH, Neuss (DE)

(72) Inventors: Cullen Guy Chrivia, Fayetteville, GA (US); Tilo Fruth, Atlanta, GA (US); John Saunders, Marietta, GA (US)

(73) Assignee: BEKO TECHNOLOGIES GMBH, Neuss (DE)

( * ) Notice: Subject to any disclaimer, the term of this patent is extended or adjusted under 35 U.S.C. 154(b) by 0 days.

(21) Appl. No.: 15/130,148

(22) Filed: Apr. 15, 2016

(51) Int. Cl.
*B01D 53/04* (2006.01)
*B01D 53/26* (2006.01)

(52) U.S. Cl.
CPC ..... *B01D 53/0454* (2013.01); *B01D 53/0423* (2013.01); *B01D 53/0438* (2013.01); *B01D 53/261* (2013.01); *B01D 2257/80* (2013.01); *B01D 2259/40086* (2013.01); *B01D 2259/40088* (2013.01)

(58) Field of Classification Search
CPC ............ B01D 53/0454; B01D 53/0423; B01D 53/0438; B01D 53/261; B01D 2257/80; B01D 2259/40086; B01D 2259/40088
USPC ....... 95/1, 10, 11, 14, 19, 21, 114, 115, 117, 95/121; 96/109, 111–115, 121, 143; 34/472, 473, 80
See application file for complete search history.

(56) References Cited

U.S. PATENT DOCUMENTS

| | | | | |
|---|---|---|---|---|
| 3,800,507 A | * | 4/1974 | Howell | B01D 53/04 95/122 |
| 4,971,610 A | * | 11/1990 | Henderson | B01D 53/0454 96/111 |
| 6,203,859 B1 | * | 3/2001 | Scheufler | B01D 46/12 34/475 |
| 7,279,026 B1 | * | 10/2007 | Fresch | B01D 53/04 95/124 |
| 2012/0012005 A1 | * | 1/2012 | Burke | B01D 53/0454 96/111 |
| 2015/0217744 A1 | * | 8/2015 | Minato | B60T 13/662 96/116 |

* cited by examiner

*Primary Examiner* — Frank Lawrence
(74) *Attorney, Agent, or Firm* — Cantor Colburn LLP (57) ABSTRACT

A method for controlling an adsorption dryer for the treatment of compressed gas includes vessels therein and a valve arrangement for selectively feeding upstream compressed gas to, and outputting dried downstream compressed gas from, the vessels. Compressed gas is fed to at least one of the vessels in a process phase for drying the compressed gas through liquid adsorption by the desiccant bed and removing the adsorbed liquid from the bed in the vessels in a regeneration phase. An ambient value occurring outside both the vessels and downstream compressed gas output is measured. Additional steps include determining a characteristic value based on the measured ambient value, matching the value to criteria associated with stored regeneration phase parameter settings, determining a regeneration phase parameter setting based on the matching of the value, and applying the parameter setting to the regeneration phase for setting a parameter of the regeneration phase.

15 Claims, 2 Drawing Sheets

METHOD FOR CONTROLLING AN ADSORPTION DRYER FOR THE TREATMENT OF COMPRESSED GAS

TECHNICAL FIELD

The disclosure is directed at a method for controlling an adsorption dryer for the treatment of compressed gas.

BACKGROUND

Compressed gas is used in a variety of industrial applications. There is regularly the need to improve or maintain the quality of compressed gas during or prior to processing as it relates to pollutants, particularly with regard to potential liquid occurring in the compressed gas. It is known from the prior art to use dryers, and in particular adsorption dryers operating based on the physical principle of adsorption, to reduce or effectively remove liquids from the compressed gas. The process of adsorption drying is energy-intensive and regularly involves the vessels of the adsorption dryer going through different phases involving successive heating and cooling. Though it is known to take sensor measurements during operation either within the vessels or of the downstream compressed gas, such sensor measurements are an insufficient basis for determinations of parameter settings aiming to avoid energy waste, overshooting in cooling or heating and spikes in dew point or temperature of the downstream compressed gas.

SUMMARY

Therefore the disclosure provides a method for reducing resource waste and improving the quality of adsorption drying of compressed gas.

The disclosure is based on the realization that sensor measurements of the ambient environment and of the upstream compressed gas, i.e. of the wet compressed gas to be treated before it has been fed to the vessels of the adsorption dryer, may be used in an intelligent control system to select suitable parameters in particular for the regeneration phase of the adsorption drying process for reducing energy waste and for at the same time improving the quality of the dried downstream compressed gas. For example, heating more than necessary in the regeneration phase is counterproductive, because any excess heat generated may result in the cooling phase to be insufficient. This in turn may lead to an elevated vessel temperature resulting in a higher dew point than would otherwise be the case.

The method according to the disclosure is for controlling an adsorption dryer for the treatment of compressed gas. The compressed gas may be any compressed gaseous substance and may for example be compressed air. According to the inventive method, the adsorption dryer comprises vessels each housing a desiccant bed. According to the inventive method, the adsorption dryer comprises a valve arrangement for selectively feeding upstream compressed gas to the vessels and for selectively outputting dried downstream compressed gas from the vessels. In general, the adsorption dryer comprises two vessels, with one vessel being operated in a process phase and the other vessel being operated in a regeneration phase at the same time and the vessels switching their respective phases after each phase. Accordingly, the method according to the disclosure comprises feeding the compressed gas to at least one of the vessels in a process phase for drying the compressed gas though liquid adsorption by the desiccant bed and subsequently removing the adsorbed liquid from the desiccant bed in the at least one of the vessels in a regeneration phase. The desiccant bed may be an arrangement of any suitable substance, which substance will generally have a structure with open pores and large inner surfaces, for adsorption of liquid from the compressed gas. Suitable desiccants include silica gel, aluminum oxide, activated carbon as well as molecular sieves.

The method according to the disclosure comprises measuring an ambient value occurring outside the vessels and outside the downstream compressed gas output from the vessels, determining a characteristic value based on the measured ambient value, matching the characteristic value to a set of criteria each associated with stored regeneration phase parameter settings, determining a regeneration phase parameter setting based on the matching of the characteristic value and applying the determined regeneration phase parameter setting to the regeneration phase for setting a parameter of the regeneration phase.

That ambient value may correspond to any kind of physical property and may be measured anywhere except either in the vessels or at a downstream outlet of the vessels or in the downstream compressed gas output from the vessels. Therefore, a value measured from the upstream compressed gas is also an ambient value in the present sense. The ambient value may comprise one or more individual values, which may also be different kinds of values, such as temperature, dew point, pressure or concentration of a particular substance. The characteristic value may either be identical to the measured ambient value or may be a single value or a plurality of values derived from the measured ambient value. Such a derived value may correspond to a physical value. The derived value may also be a numeric value without intrinsic physical meaning. Matching the characteristic value may comprise identifying the criterion which matches the characteristic value. It may also comprise identifying the one or more criteria which most closely match the characteristic value. Any criterion may also stipulate a value range to match rather than a precise value to match. Generally, the determined regeneration phase parameter setting will be that stored regeneration phase parameter setting associated with the particular criterion matching the characteristic value or will be a regeneration phase parameter setting selected from among the stored regeneration phase parameter settings associated with the criteria most closely matching the characteristic value. Applying the determined regeneration phase parameter setting to the regeneration phase for setting a parameter of the regeneration phase means that the application of the determined regeneration phase parameter setting involves influencing a physical process property during the regeneration phase, in particular as it relates to a physical process within the respective vessel in the regeneration phase.

The determined regeneration phase parameter setting may either comprise a specific and explicit setting value which is unambiguous. The determined regeneration phase parameter setting may also comprise a value bracket, a function, parameter curve or some other algorithm for arriving at the actual setting value. In that case, the actual setting value may only be arrived when some other further input, for example a further measured value, a time value or a user input, has been applied to the determined regeneration phase parameter setting, in particular to the corresponding value bracket, function, parameter curve or other algorithm.

A preferred embodiment of the method according to the disclosure is that the adsorption dryer comprises an external sensor arrangement for measuring the ambient value occurring outside the vessels. Accordingly, the external sensor arrangement may be any kind of sensor suitable for measuring the ambient value. It is preferred that the sensor arrangement comprises an environment sensor for measuring an ambient environment value from the environment. Such an ambient environment value may in particular be an ambient temperature, an ambient humidity and/or an ambient dew point. Alternatively or in addition, the sensor arrangement may comprise an upstream compressed gas sensor for measuring an upstream ambient value—in particular an upstream compressed gas temperature—from the upstream compressed gas. This means that the ambient value is measured from the compressed gas prior to being fed to at least one of the vessels.

A further preferred embodiment of the method according to the disclosure is that the adsorption dryer comprises a processing apparatus with a main processor and nonvolatile memory, that the processing apparatus is configured to control the valve arrangement in the process phase and in the regeneration phase, that the processing apparatus is configured to determine the characteristic value, to match the characteristic value to the set of criteria, to determine the regeneration phase parameter setting and to apply the determined regeneration phase parameter setting, and that the set of criteria as well as the associated regeneration phase parameter settings are stored in the nonvolatile memory. Such a processing apparatus may for example be a regular personal computer, an embedded computer or any microprocessor system as is comprised e.g. in a PLC (programmable logic controller) or a similar device, with the main processor being for example a CPU (central processing unit) of the aforementioned devices. The nonvolatile memory may be any computer memory which retains data after a power-down, e.g. any hard drive, solid state drive, ROM, Flash memory, or other memory device with similar properties.

In a preferred embodiment of the method according to the disclosure, the adsorption dryer comprises a process sensor arrangement for measuring a process value occurring inside the vessels or at an outlet of the vessels or in the downstream compressed gas and the method further comprises saving the measured process value and determining the characteristic value also based on the measured process value, so that determining the regeneration phase parameter setting is also based on the measured process value. Thereby, a physical property measured in the vessel or at an outlet of the vessel or in the downstream gas also—i.e. in addition to the measured ambient value—forms a basis for determining and applying the regeneration phase parameter setting. Thus, both internal or process and external or ambient factors can influence the parameters of the regeneration phase.

A preferred embodiment of the method according to the disclosure is that the measured process result value comprises a dew point and/or a downstream compressed gas temperature and/or a vessel outlet temperature and/or a vessel temperature. The dew point, which is given in the same units as a temperature and is valid for a particular pressure, may in particular be a downstream compressed gas dew point, i.e. the dew point of the downstream compressed gas at its respective pressure. The vessel temperature is preferably an inside temperature of the vessels, i.e. a temperature measured within one of the vessels. In particular, the vessel temperature may be a desiccant temperature measured within the desiccant bed.

A further preferred embodiment of the method according to the disclosure is that the method comprises operating the adsorption dryer in a series of treatment cycles, wherein each treatment cycle comprises a process phase and a regeneration phase, that the measured process values and/or the ambient values from a plurality of treatment cycles are saved to form a saved history of measured process values and/or ambient values, that the saved history is processed to obtain a trend value and that determining the characteristic value is also based on the trend value, so that determining the regeneration phase parameter setting is also based on the trend value. Here it is to be pointed out that generally in the operation of the adsorption dryer each of the vessels undergoes the aforementioned treatment cycles, with the respective phases of the treatment cycle being shifted among the vessels. The measured process values and/or ambient values may preferably be saved by storing them in the nonvolatile memory. The aforementioned trend value may be identical to or a subset of the measured process values and/or the ambient values or it may be derived in an essentially arbitrary way from the history of the measured process values. Thereby, the determination of the regeneration phase parameter setting to be applied is not only based on a one-time measurement, but instead relies on data from multiple iterations, which reduces the incidence of non-optimal parameter settings due to measurement outliers.

In a preferred embodiment of the method according to the disclosure, the method comprises determining the characteristic value also based on a user setting, which user setting is input by a user of the adsorption dryer, so that determining the regeneration phase parameter setting is also based on the user setting. Preferably, the user setting is stored in the nonvolatile memory. According to one preferred embodiment, the user setting is input and stored prior to measuring the ambient value or even prior to beginning operation of the adsorption dryer. According to a further preferred embodiment, the user settings is input by the user after a preliminary set of potential regeneration phase parameter settings has been determined and provided to the user based on the measured ambient value. Thus, the input of the user setting may occur in an interactive process which is concurrent to the process phase and/or the regeneration phase. The user setting may comprise the explicit specification of a process parameter, e.g. a temperature or a dew point. The user setting may also comprise the setting of a general user preference, in particular a prioritization of a quality parameter, e.g. a prioritization of throughput over energy conservation or vice versa.

A preferred embodiment of the method according to the disclosure is that the regeneration phase comprises a heating phase in which heating phase the temperature of the at least one vessel in the regeneration phase is raised. Alternatively or in addition to the heating phase, the regeneration phase may also comprise a cooling phase in which cooling phase the temperature of the at least one vessel in the regeneration phase is lowered and/or a stripping phase in which stripping phase liquid deposited in the at least one vessel in the regeneration phase is swept from the at least one vessel in the regeneration phase. The stripping phase may also lead to a—in particular additional—lowering of the temperature of the at least one vessel in the regeneration phase.

Preferably the cooling phase is subsequent to the heating phase. Further preferably, the stripping phase is subsequent to the cooling phase. According to a preferred embodiment, in the heating phase the temperature of the at least one vessel in the regeneration phase is raised above the regeneration temperature, which regeneration temperature is the temperature from which adsorbed liquid evaporates from the desiccant bed. This is so that the liquid adsorbed by the desiccant bed in the process phase is removed and thereby the adsorption capacity of the desiccant bed is replenished.

In the heating phase, preferably ambient air which has been heated in a heater of the adsorption dryer is fed by a blower of the adsorption dryer into the at least one vessel in the regeneration phase.

According to another preferred embodiment, in the cooling phase the temperature of the at least one vessel in the regeneration phase is lowered below the regeneration temperature and in particular lowered substantially to the ambient temperature of the adsorption dryer. Because the liquid adsorption in the process phase generates heat and because such liquid adsorption becomes less effective with increasing temperature, this cooling phase is to ensure that a lower operating temperature is returned to for the following process phase.

The liquid deposited in the at least one vessel in the regeneration phase which is to be swept from the at least one vessel in the regeneration phase during the stripping phase in particular comprises liquid adsorbed by the desiccant bed during the cooling phase, especially in the case when ambient air is fed to the at least one vessel in the regeneration phase during the cooling phase, which ambient air generally has a non-negligible humidity leading to the humidity's at least partial adsorption by the desiccant bed during the cooling phase.

Further with respect to the stripping phase, it is preferred that the deposited liquid is swept from the at least one vessel by feeding a stripping gas to the at least one vessel in the regeneration phase for absorption of the deposited liquid and subsequently diverting the stripping gas with the liquid absorbed by the stripping gas from the at least one vessel in the regeneration phase. With regard to diverting the stripping gas, it is further preferred that the stripping gas is released to the ambient environment, thereby also diverting the stripping gas from the at least one vessel in the regeneration phase.

The regeneration phase may also comprise a parallel flow phase in which parallel flow phase upstream compressed gas is fed to two vessels including the at least one vessel in the regeneration phase. This parallel flow phase may in particular be comprised by the cooling phase, so that it is executed during the cooling phase, for example after cooling by ambient air or after cooling by compressed gas which has been dried in the process phase and which is expanded and fed to the at least one vessel in the regeneration phase. The parallel flow phase may also be comprised in the stripping phase and in particular at the end of the stripping phase, so that the parallel flow phase is executed just prior to a switching of the process phase and the regeneration phase. Further, the execution of such a parallel flow phase may be conditional on the determined regeneration phase parameter setting which is applied to the regeneration phase. In other words, whether or not such a parallel flow phase is executed is determined based on the determined regeneration phase parameter setting. Such a parallel flow phase may help in completing the cooling of the at least vessel in the regeneration phase and may lead to a more homogeneous temperature curve.

A further preferred embodiment of the method according to the disclosure is that the regeneration phase parameter setting comprises a specification of a stop condition for the end of the cooling phase and/or a target cooling temperature of the cooling phase. The stop condition for the end of the cooling phase may be any condition which, when met, causes the cooling phase to end. If a stripping phase is scheduled, this preferably causes the transition to the stripping phase. If there is no stripping phase scheduled, the stop condition may also cause the transition to the process phase from the regeneration phase. The stop condition may in particular be a stop time condition, which for example may specify a total duration for the cooling phase. In the case of a target cooling temperature, the stop condition is realized when that target cooling temperature is reached in the at least one vessel, in particular at the desiccant bed.

According to a preferred embodiment of the method according to the disclosure, the regeneration phase parameter setting comprises a duration shift setting for adjusting the duration of the process phase with respect to the regeneration phase. Thus the duration of the process phase and the duration of the regeneration phase are changed based on the duration shift setting with the total duration of the process phase and the regeneration phase remaining constant. In particular, the duration shift setting may be for extending the duration of the process phase and for shortening the duration of the regeneration phase. If it turns out that a shorter regeneration phase is sufficient to effect a complete regeneration, then it is more economical to extend the process phase.

In a preferred embodiment of the method according to the disclosure, the cooling phase and/or the stripping phase comprises a preferably selectable purge process, in which purge process compressed gas which has been dried in the process phase is expanded and fed to the at least one vessel in the regeneration phase. This compressed gas may in particular be downstream compressed gas. Preferably, this compressed gas is downstream compressed gas output from one of the vessels in the process phase. As described above, during the regeneration phase of the at least one vessel another one of the vessels is in the process phase. Because of having been dried and of having been expanded, there is substantially no adsorption of liquid from that gas by the desiccant bed. "Purging" in the purge process accordingly denotes feeding compressed gas, which preferably has already undergone drying in the process phase and is consequently downstream of the at least one vessel in the regeneration phase, to that vessel in expanded form. The purge process is selectable, in other words it is performed if and only if the applicable conditions are met, i.e. when it is selected. The purge process may be selected based on the determined regeneration phase parameter setting. Preferably, the expanded compressed gas fed to the at least one vessel in the regeneration phase is the stripping gas. Thus, the described purge process may be identical to, may be comprised in or may overlap with the stripping phase described above.

A preferred embodiment of the method according to the disclosure is that the regeneration phase parameter setting comprises a selection of a cooling method for the cooling phase, wherein the cooling method is selected from among a group of selectable cooling methods, which group of selectable cooling methods comprises a method of inactive cooling, a method of cooling by blowing ambient air into the at least one vessel in the regeneration phase, a method of cooling by the purge process, in which purge process in the cooling phase compressed gas which has been dried in the process phase is expanded and fed to the at least one vessel in the regeneration phase, and/or by a method of cooling by combining blowing ambient air into the at least one vessel in the regeneration phase with the purge process. The compressed gas which has been dried in the process phase may in particular be downstream compressed gas. Thus, among different ways of cooling the most appropriate one may be selected. For example, the suitability of using ambient air for cooling may depend on the humidity and/or the temperature of the ambient air. Inactive cooling denotes keeping the at least one vessel in the regeneration phase without feeding either compressed gas or ambient air, so that cooling is effected by the normal process of heat dissipation. Especially when the cooling phase comprises the purge process, this may effectively result in a cooling phase which has the same effect as the stripping phase and may be understood to present a combined cooling and stripping phase. In such a case, there may be no need for a separate stripping phase after the cooling phase which is distinguishable from the cooling phase.

In a further preferred embodiment, the regeneration phase parameter setting comprises a purge amount setting based on which the amount of expanded compressed gas fed to the at least one vessel in the regeneration phase is determined. That amount may also be given as a fraction of ambient air fed or blown into the at least one vessel in the regeneration phase. Determining a suitable purge amount setting may for example depend on the humidity of the ambient air, which in this case may have been used for the preceding cooling phase and which accordingly may have resulted in the deposition of liquid within the vessel depending on that humidity.

A further preferred embodiment of the method according to the disclosure is that the regeneration phase parameter setting comprises a specification of a start condition for the beginning of the regeneration phase and/or comprises a stop condition for the end of the regeneration phase. Equally as described above for the stop condition for the end of the cooling phase, the start condition for the beginning of the regeneration phase and the stop condition for the end of the regeneration phase, respectively, may be any condition which, when met, causes the regeneration phase to begin or the regeneration phase to end, respectively. Preferably, the regeneration phase begins and ends in alternation with the process phase, such that the beginning of either is the end of the other and vice versa. The start condition for the beginning of the regeneration phase may be a start time condition and/or the stop condition for the end of the regeneration phase may be a stop time condition. Such conditions may for example specify a total duration for the process phase and/or the regeneration phase. They may also specify a total duration bracket, with the exact duration within the bracket being determined by further factors. The specification of such a condition may also lead to the adjustment of the duration of the process phase with respect to the regeneration phase as described above.

It is further preferred that the regeneration phase parameter settings comprise a specification of the heating phase, which is preferably the specification of a target heating temperature and/or of a heating phase stop condition. Such a heating phase stop condition may be a heating phase duration. The target heating temperature may be a temperature up to which the temperature of the at least one vessel in the regeneration phase is raised in the heating phase. It may be that the at least one vessel in the regeneration phase is kept at that target heating temperature for a target duration, which target duration in turn may be set by or determined based on a regeneration phase parameter setting.

In a preferred embodiment of the method according to the disclosure, the set of criteria are each associated with a regeneration recipe, wherein each regeneration recipe comprises a plurality of regeneration phase parameter settings, and that determining a regeneration phase parameter setting comprises determining a regeneration recipe based on the matching of the characteristic value. It is further preferred that the plurality of regeneration phase parameter settings is applied at least partially concurrently to the regeneration phase. According to this preferred embodiment, in any case more than one regeneration phase parameter setting is determined and applied. Moreover, it is preferred that at least some of the regeneration phase parameter settings are applied at the same time, which may in particular mean that they relate to different properties which are influenced substantially independently. For example, the regeneration phase parameter settings may relate to a target temperature and to a target pressure. It is further preferred that the regeneration recipes each comprise a heating phase parameter for setting a parameter of the heating phase, a cooling phase parameter for setting a parameter of the cooling phase and a stripping phase parameter for setting a parameter of the stripping phase. Thus, the regeneration recipes relate to each of the individual phases within the regeneration phase.

A further preferred embodiment of the method according to the disclosure is that the regeneration recipe comprises a control flow of the plurality of regeneration phase parameter settings with control statements, so that the application for at least some of the plurality of regeneration phase parameter settings is dependent on a condition evaluation by the control statements, preferably, wherein the control flow is a nested control flow so that an execution of the control flow can pass multiple control statements. The control statements and their condition evaluation may also be based on the user setting input by the user, which user setting has already been described above. The input of the user setting by the user may also occur in the interactive process.

A preferred embodiment of the method according to the disclosure is that measuring the ambient value comprises measuring a moisture value and/or a pressure value and/or a temperature value of the upstream compressed gas with a sensor arranged upstream of the vessels, which sensor may in particular be the upstream compressed gas sensor. Here preferably determining the characteristic value comprises determining a water load of the upstream compressed gas. Based on this water load and the absorption capacity of the desiccant bed, which is known a priori, a calculation or projection of the amount of adsorption in the desiccant bed can be made. Thereby, the heating phase can be appropriately parameterized. Excessive heating in the heating phase, for example heating continuing after evaporation of the adsorption is complete, is disadvantageous, in particular because on the one hand it wastes energy and on the other hand in increases the cooling that is necessary in the subsequent cooling phase. Further, given a cycle time between the process phase and the regeneration phase, it is preferable to use a lower target heating temperature for the heating phase if the time allotted for the heating phase within the regeneration phase is sufficient to complete evaporation from the desiccant bed in the heating phase. It is preferred that the determined regeneration phase parameter setting comprises a specification of the heating phase, in particular a target heating temperature and/or a heating phase stop condition, dependent on the determined water load. Alternatively or in addition, the determined regeneration phase parameter setting may comprise stop a condition for the end of the regeneration phase dependent on the determined water load.

The adsorption dryer for the treatment of compressed gas according to the disclosure comprises vessels each housing a desiccant bed and comprises a valve arrangement for selectively feeding upstream compressed gas to the vessels and for selectively outputting dried downstream compressed gas from the vessels. The adsorption dryer according to the disclosure further comprises a processing apparatus with a main processor and nonvolatile memory, which processing apparatus is configured to control the valve arrangement in the process phase and in the regeneration phase, wherein the valve arrangement is configured to feed the compressed gas to at least one of the vessels in a process phase for drying the compressed gas through liquid adsorption by the desiccant bed and subsequently removing the adsorbed liquid from the desiccant bed in the at least one vessels in a regeneration phase.

The adsorption dryer according to the disclosure is that the adsorption dryer comprises an external sensor arrangement for measuring an ambient value occurring outside the vessels and outside the downstream compressed gas output from the vessels, that the processing apparatus is configured to determine a characteristic value based on the measured ambient value, that the processing apparatus is configured to match the characteristic value to a set of criteria each associated with regeneration phase parameter settings stored in the nonvolatile memory and that the processing apparatus is configured to determine a regeneration phase parameter setting based on the matching of the characteristic value and to apply the determined regeneration phase parameter setting to the regeneration phase for setting a parameter of the regeneration phase.

Preferred embodiments, features and properties of the adsorption dryer according to the disclosure correspond to respective preferred embodiments, features and properties of the method according to the disclosure and vice versa.

BRIEF DESCRIPTION OF THE DRAWINGS

Additional details, features, goals and advantages of the present disclosure are further explained in the following with regard to the Figures representing a preferred embodiment. As explained below, it is shown in FIG. 1 a schematic view of an embodiment of an adsorption dryer for the treatment of compressed gas according to the disclosure and FIG. 2 a schematic view of the operating principle of an embodiment of a method according to the disclosure.

DETAILED DESCRIPTION OF THE DRAWINGS

Figure 1:
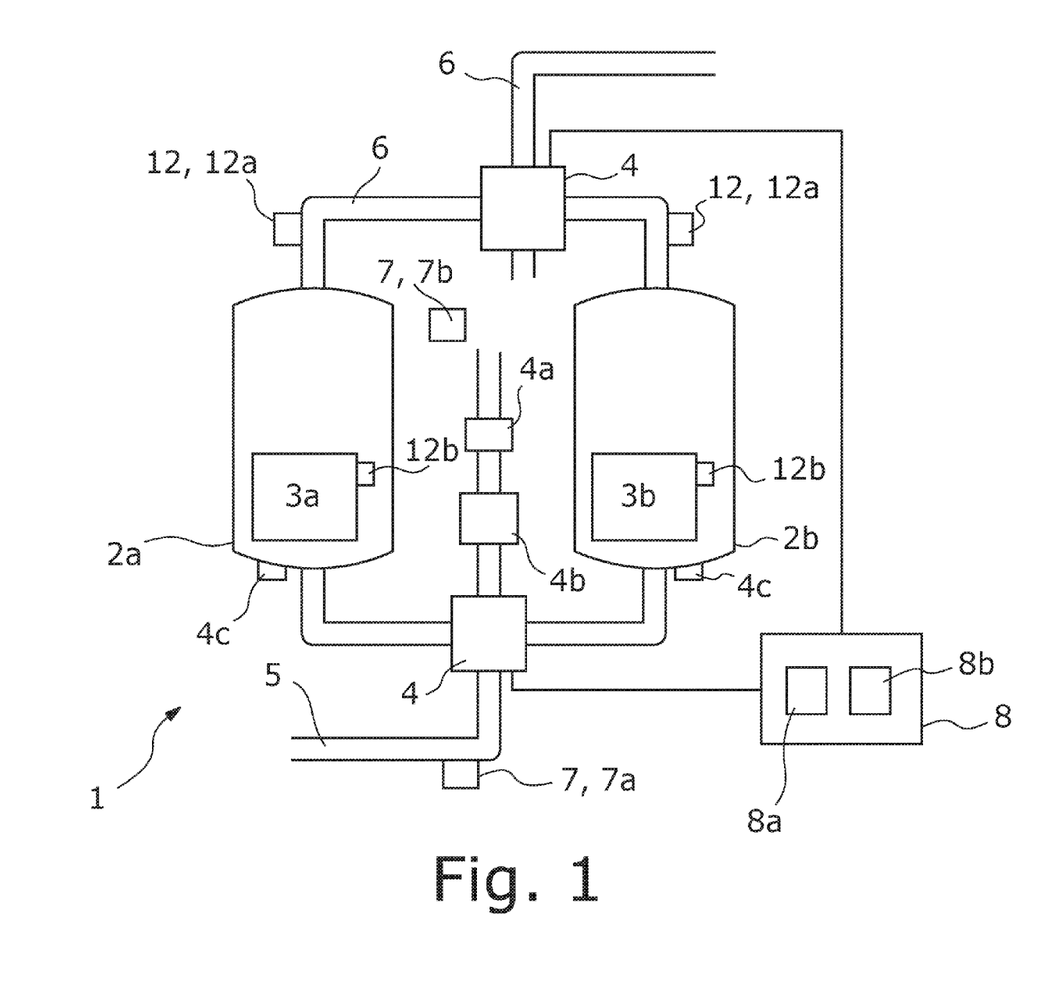

The adsorption dryer 1 shown in FIG. 1 according to an embodiment of the disclosure is configured for the treatment of compressed gas. The adsorption dryer comprises two vessels 2a, b with each vessel 2a, b housing a desiccant bed 3a, b. The desiccant beds 3a, b each comprise desiccant material for removing by adsorption liquid from gas, in particular compressed gas, which has been fed to the respective vessel 2a, b. This process of adsorption drying is known from the prior art.

The valve arrangement 4 is configured to feed upstream compressed gas 5, which is the compressed gas fed to the adsorption dryer 1 which has not been treated yet, to either one of the vessels 2a, b. This upstream compressed gas 5 comprises humidity and is therefore wet. The vessel 2a to which that upstream compressed gas 5 is fed is operated in the process phase, meaning that drying of the compressed gas by adsorption takes place in that vessel 2a. This process generates heat, thereby increasing the temperature in vessel 2a. The valve arrangement 4 is further configured to output the dried downstream compressed gas 6, i.e. the treated compressed gas coming out of the vessel 2a, for further processing, transportation to another facility or the like.

During the time in which the vessel 2a being fed the upstream compressed gas 5 is operated in the process phase, the other vessel 2b is operated in the regeneration phase. The regeneration phase is to remove the liquid adsorbed by the desiccant bed 3b in the previous process phase of that vessel 2b. The combined duration of the process phase and the regeneration phase is typically between 8 and 12 hours, with the respective vessels 2a, b switching from the regeneration phase to the process phase or vice versa generally after half the combined duration and the valve arrangement 4 then feeding the upstream compressed gas 5 to the vessel which had previously been operated in the regeneration phase. However, it is possible to extend the duration of the process phase and shorten the duration of the regeneration phase or vice versa. Switching the vessels 2a, b between the regeneration phase and the process phase involves the valve arrangement 4 implementing the appropriate changes to the flow of the upstream compressed gas 5, the downstream compressed gas 6 and/or the ambient gas.

As shown in FIG. 1, the adsorption dryer 1 comprises a sensor arrangement 7 with an upstream compressed gas sensor 7a and an environment sensor 7b, which are configured to measure different physical values such as temperature, humidity and pressure of the upstream compressed gas 5 and the ambient air, respectively.

As also shown in FIG. 1, the adsorption dryer 1 further comprises a processing apparatus 8 with a main processor 8a and nonvolatile memory 8b, which here is a hard drive. The processing apparatus 8 controls the valve arrangement 4 and other components of the adsorption dryer 1.

Figure 2:
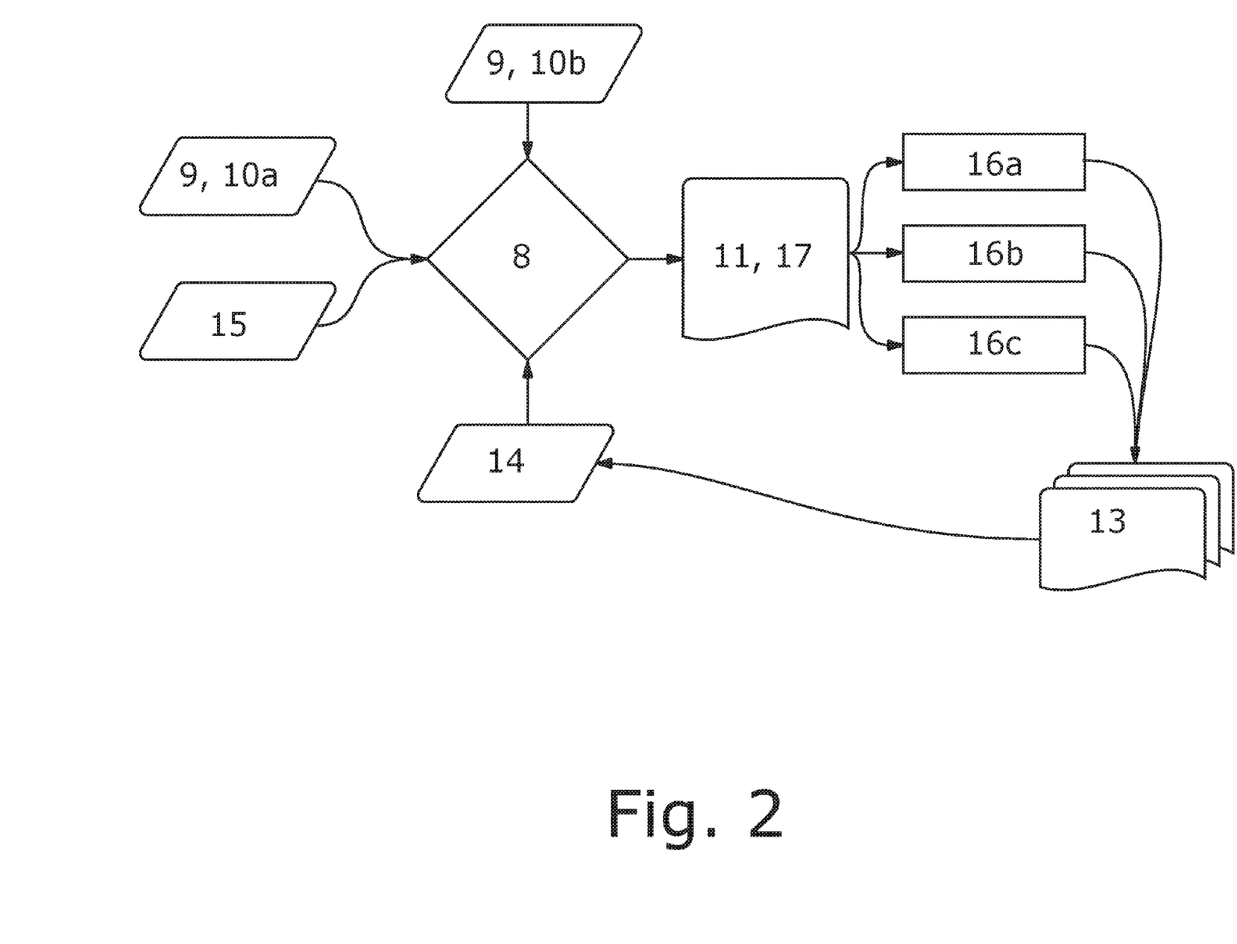

The operation of the method according to the disclosure is now described with reference to FIG. 2. In the present embodiment, the processing steps are performed by the processing apparatus 8, which accordingly is shown in the center of FIG. 2. The processing apparatus 8 receives an ambient value 9, which has been measured either by the compressed gas sensor 7a or the environment sensor 7b. Based on this ambient value 9 a characteristic value is determined, which characteristic value in this case is equal to the ambient value 9 itself. The processing apparatus 8 then matches that characteristic value—i.e. here the ambient value 9—to criteria. In one example, the ambient value 9 is an environment ambient value 10a measured by the environment sensor 7b and the criteria are predefined ambient value brackets, with the matching criterion being that predefined ambient value bracket to which the measured ambient value 9 corresponds.

Along with the criteria, a set of regeneration phase parameter settings 11 is stored in the nonvolatile memory 8b, wherein each criterion is associated with a stored regeneration phase parameter setting 11. The processing apparatus 8 then determines the regeneration phase parameter setting 11 to which the matching criterion is associated and applies that regeneration phase parameter setting 11 to the regeneration phase.

In a further example and as specifically shown in FIG. 2, the measured ambient value 9 further comprises an upstream ambient value 10b from the upstream compressed gas 5 measured by the upstream compressed gas sensor 7a, with the characteristic value then being derived from a formula applied to the upstream ambient value 10b and the environment ambient value 10a. Accordingly, the criteria are value brackets for the characteristic values derived from the formula.

In yet another example, the adsorption dryer 1 also comprises a process sensor arrangement 12—shown in FIG. 1—for measuring a process value occurring inside the vessels 2a, b or in the downstream compressed gas 6. In particular, that process sensor arrangement 12 comprises downstream compressed gas sensors 12a for measuring process values in the downstream compressed gas 6 and desiccant bed sensors 12b for measuring a respective temperature—which temperature also a process value—in the desiccant beds 3a, b, which are in the corresponding vessel 2a, b. Process values in the downstream compressed gas 6 may include a downstream compressed gas dew point and a downstream compressed gas temperature. In this example, the characteristic value is derived also with consideration of these process values.

It is also possible that at different times in the operation of the adsorption dryer 1, different values are used to determine the characteristic value, thereby also making different criteria applicable at different times. Alternatively or in addition, this may involve a process with multiple determination stages, wherein for each stage a particular value is used to determine a characteristic value and to apply relevant criteria, with the particulars of the next stage depending on the matching results of the previous stage. Such multiple determination stages may be comprised in a control flow, which comprises a plurality of regeneration phase parameter setting 11 and control statements. Here the control statements may control the transition from one such determination stage to the next.

A further factor which may influence the determination of the regeneration phase parameter setting are measurements from previous treatment cycles, with each treatment cycle comprising a process phase and a regeneration phase. Based on reports 13 from each treatment cycle, a saved history 14 of measured process values and ambient values 9 is formed. That saved history 14 is also saved in the nonvolatile memory 8b. The processing apparatus 8 obtains a trend value from the saved history 14, which trend value may also be identical to the saved history 14. Preferably, the trend value presents a digest of the saved history 14 as it relates to determination of the regeneration phase parameter setting 11. For example, the trend value may establish a calibration between a particular regeneration phase parameter setting 11, i.e. a particular set value, and the resulting effect, for example of a particular temperature reached. Thereby, such a desired temperature may be reached more reliably in future treatment cycles by avoiding the effects of miscalibrations.

In an additional example and as also shown in FIG. 2, the determination of the characteristic value for matching to the criteria may also be based on a user setting 15, which is generally any information input by a user of the adsorption dryer 1. Thus the user setting 15 may be stored in the nonvolatile memory 8b and may be either input prior to operation of the adsorption dryer 1. It may also be input during the determination of the regeneration phase parameter setting 11. This may involve determining a preliminary set of potential regeneration phase parameter settings 11 and then making a specific determination among these based on a user setting 15 input by the user in an interactive operation mode. Alternatively, the user setting 15 may be just a general selection of e.g. an "economic mode", based on which the processing apparatus 8 would generally determine regeneration phase parameter settings 11 favoring reduction of energy waste, as opposed to e.g. maximizing throughput.

As further shown in FIG. 2, the regeneration phase may itself be subdivided into a heating phase 16a for raising the temperature in the appropriate vessel 2a, b above the regeneration temperature, a subsequent cooling phase 16b for lowering the temperature in that vessel 2a, b below the regeneration temperature or even to the ambient temperature and a stripping phase 16c after the cooling phase 16b for removing any liquid from the vessel 2a, b, in particular liquid which may have been introduced by ambient air introduced into the appropriate vessel 2a, b in the preceding cooling phase 16b. The determined regeneration phase parameter setting 11 may apply to any and all such sub-phases—heating phase 16a, cooling phase 16b, stripping phase 16c—of the regeneration phase.

For feeding ambient air to the vessels 2a, b, for example for the cooling phase 16b, the valve arrangement comprises appropriate blowers 4a as well as a heater 4b as shown in FIG. 1. The adsorption dryer 1 also comprises vessel heaters 4c for more directly heating the respective vessel 2a, 2b. The valve arrangement 4 can also switchably implement a purge process, in which compressed gas which has already been dried, for example the downstream compressed gas 6 which has just been treated in the vessel 2a operating in the process phase, is expanded and fed back to the vessel 2b in the regeneration phase. Such a purging is advantageous during or after the cooling phase 16b, in particular during the stripping phase 16, in order to remove any liquid introduced into the vessels 2a, b by any ambient air in the cooling phase 16b, which ambient air will generally have higher humidity than the dried downstream compressed gas 6.

The stored regeneration parameter settings 11 may each be part of a larger, more comprehensive set of regeneration phase parameter settings 11, which larger set is denoted as a regeneration recipe 17. Such a regeneration recipe 17 comprises a plurality of regeneration phase parameter settings 11 which are here applied at least partially concurrently, which means that more than one of the regeneration phase parameter settings 11 of the regeneration recipe 17 is applied at the same time. The regeneration phase parameter settings 11 of any one regeneration recipe 17 also pertain to different phases of the regeneration phase, e.g. the heating phase 16a, the cooling phase 16b and the stripping phase 16c, rather than all relating to only a single one of these sub-phases. Such regeneration recipes 17 may also comprise the control flow described above with the control statements.

In the following, some specific examples for regeneration phase parameter settings 11 or regeneration recipes 17 are provided in that possible connections between measured values, in particular measured ambient values 9, to determined regeneration phase parameter settings 11 and the effect of their application to the regeneration phase are described. In all of the described cases, additional measured value and in particular additional measured ambient values 9 may also factor into the determination of the described regeneration phase parameter setting 11 or regeneration recipe 17.

Based on the measurement of a downstream compressed gas dew point as a process value by a downstream compressed gas sensor 12a, which gas dew point is lower than expected, it may be determined that the appropriate desiccant bed 3a, b is not saturated. Consequently, the determined regeneration phase parameter setting 11 or regeneration recipes 17 provides for a delayed start time as start time condition for the beginning of the next regeneration phase. Such an adjustment of the beginning of the next regeneration phase also leads to an adjustment of the duration preceding process phase based on a cycle of fixed duration. Therefore, the duration of the process phase may be extended and the duration of the regeneration phase shortened, which results in significant energy savings.

Based on the measurement of a downstream compressed gas temperature as a process value by the process sensor arrangement 12, which measured downstream compressed gas temperature is indicative of having reached the regeneration temperature before the expiry of the predefined heating phase 16a, it may be determined that no more heating is required in the heating phase 16a. Then the determined regeneration phase parameter setting 11 or regeneration recipes 17 provides for a reduced heating time as a stop time condition for the end of the heating phase 16a.

Based on the measurement of an upstream compressed gas temperature and an ambient dew point as respective ambient values 9, it may be determined that it is sufficient to use a lower regeneration temperature or heating at a lower energy rate, thereby conserving energy for the heating phase 16a. Alternatively or in addition, it may be determined to set a lower temperature threshold for determining completion of the heating phase 16a. Thus, the determined regeneration phase parameter setting 11 or regeneration recipe 17 would provide for the application of the appropriate parameters.

In a further example, it may be determined whether or not to have a purge process as already described in the current regeneration phase. For example, based on the measurement of an ambient dew point or the measurement of an inside temperature of the appropriate vessel 2a, b during the cooling phase 16b, it may be determined that no stripping phase 16c is necessary or that no purge process is necessary in the stripping phase 16c, because either the temperature within the vessel 2a, b or the ambient air, as evinced by a measurement of the ambient dew point or of the ambient humidity, is such that the ambient air introduced in the cooling phase 16b will not lead to deposition of liquid in the cooling phase 16b to the extent that makes the execution of a stripping phase 16c or of a purge process necessary or advisable. This determination relating to the purge process and/or the stripping phase 16c may also depend on a user setting 15.

Further, based on the measurement of an inside temperature of the appropriate vessel 2a, b, it may be determined that the cooling phase 16b is stopped earlier than originally scheduled, so that the regeneration phase parameter setting 11 or the regeneration recipe 17 provides for a reduced cooling time as a stop time condition for the end of the cooling phase 16b.

The invention claimed is:

1. A method for controlling an adsorption dryer for the treatment of compressed gas, the adsorption dryer comprising vessels each housing a desiccant bed and comprising a valve arrangement for selectively feeding upstream compressed gas to the vessels and for selectively outputting dried downstream compressed gas from the vessels, the method comprising feeding the compressed gas to at least one of the vessels in a process phase for drying the compressed gas though liquid adsorption by the desiccant bed and subsequently removing the adsorbed liquid from the desiccant bed in the at least one of the vessels in a regeneration phase,
wherein
the method comprises measuring an ambient value occurring outside the vessels and outside the downstream compressed gas output from the vessels, determining a characteristic value based on the measured ambient value, matching the characteristic value to a set of criteria each associated with stored regeneration phase parameter settings, determining a regeneration phase parameter setting based on the matching of the characteristic value and applying the determined regeneration phase parameter setting to the regeneration phase for setting a parameter of the regeneration phase.

2. The method according to claim 1, wherein the adsorption dryer comprises an external sensor arrangement for measuring the ambient value occurring outside the vessels, preferably, that the sensor arrangement comprises an environment sensor for measuring an ambient environment value, in particular an ambient temperature and/or an ambient humidity and/or an ambient dew point, from the environment and/or that the sensor arrangement comprises an upstream compressed gas sensor for measuring an upstream ambient value, in particular an upstream compressed gas temperature, from the upstream compressed gas.

3. The method according to claim 1, wherein the adsorption dryer comprises a processing apparatus with a main processor and nonvolatile memory, that the processing apparatus is configured to control the valve arrangement in the process phase and in the regeneration phase, that the processing apparatus is configured to determine the characteristic value, to match the characteristic value to the set of criteria, to determine the regeneration phase parameter setting and to apply the determined regeneration phase parameter setting, and that the set of criteria as well as the associated regeneration phase parameter settings are stored in the nonvolatile memory.

4. The method according to claim 1, wherein the adsorption dryer comprises a process sensor arrangement for measuring a process value occurring inside the vessels or at an outlet of the vessels or in the downstream compressed gas and that the method further comprises saving the measured process value and determining the characteristic value also based on the measured process value, so that determining the regeneration phase parameter setting is also based on the measured process value.

5. The method according to claim 4, wherein the measured process value comprises a dew point, a downstream compressed gas dew point, and/or a downstream compressed gas temperature and/or a vessel outlet temperature, measured at the outlet of the vessels, and/or a vessel temperature, an inside temperature of the vessels.

6. The method according to claim 4, wherein the method comprises operating the adsorption dryer in a series of treatment cycles, wherein each treatment cycle comprises a process phase and a regeneration phase, that the measured process values and/or ambient values from a plurality of treatment cycles are saved to form a saved history of measured process values and/or ambient values, that the saved history is processed to obtain a trend value and that determining the characteristic value is also based on the trend value, so that determining the regeneration phase parameter setting is also based on the trend value.

7. The method according to claim 1, wherein the method comprises determining the characteristic value also based on a user setting, which user setting is input by a user of the adsorption dryer, so that determining the regeneration phase parameter setting is also based on the user setting, that the user setting is stored in the nonvolatile memory, that the user setting is input by the user after a preliminary set of potential regeneration phase parameter settings has been determined and provided to the user based on the measured ambient value.

8. The method according to claim 1, wherein the regeneration phase comprises a heating phase in which heating phase the temperature of the at least one vessel in the regeneration phase is raised and/or a cooling phase, in which cooling phase the temperature of the at least one vessel in the regeneration phase is lowered and/or a stripping phase, in which stripping phase liquid deposited in the at least one vessel in the regeneration phase is swept from the at least one vessel in the regeneration phase, in particular, that the deposited liquid is swept by feeding a stripping gas to the at least one vessel in the regeneration phase for absorption of the deposited liquid and subsequently diverting the stripping gas with the liquid absorbed by the stripping gas from the at least one vessel in the regeneration phase, wherein the stripping gas is released to the ambient environment.

9. The method according to claim 8, wherein the cooling phase and/or the stripping phase comprises a selectable purge process, in which purge process compressed gas which has been dried in the process phase is expanded and fed to the at least one vessel in the regeneration phase, wherein the expanded compressed gas fed to the at least one vessel in the regeneration phase is the stripping gas.

10. The method according to claim 9, wherein the regeneration phase parameter setting comprises a selection of a cooling method for the cooling phase, wherein the cooling method is selected from among a group of selectable cooling methods, which group of selectable cooling methods comprises a method of inactive cooling, a method of cooling by blowing ambient air into the at least one vessel in the regeneration phase, a method of cooling by the purge process, in which purge process in the cooling phase compressed gas which has been dried in the process phase is expanded and fed to the at least one vessel in the regeneration phase, and/or by a method of cooling by combining blowing ambient air into the at least one vessel in the regeneration phase with the purge process, preferably, wherein the regeneration phase parameter setting comprises a purge amount setting based on which the amount of expanded compressed gas fed to the at least one vessel in the regeneration phase is determined.

11. The method according to claim 1, wherein the regeneration phase parameter setting comprises a specification of a start condition, in particular a start time condition, for the beginning of the regeneration phase and/or comprises a stop condition, in particular a stop time condition, for the end of the regeneration phase, that the regeneration phase parameter setting comprises a specification of the heating phase of a target heating temperature and/or of a heating phase stop condition.

12. The method according to claim 1, wherein the set of criteria are each associated with a regeneration recipe, wherein each regeneration recipe comprises a plurality of regeneration phase parameter settings, and that determining a regeneration phase parameter setting comprises determining a regeneration recipe based on the matching of the characteristic value, in particular, that the plurality of regeneration phase parameter settings is applied at least partially concurrently to the regeneration phase, wherein the regeneration recipes each comprise a heating phase parameter for setting a parameter of the heating phase, a cooling phase parameter for setting a parameter of the cooling phase and a stripping phase parameter for setting a parameter of the stripping phase.

13. The method according to claim 12, wherein the regeneration recipe comprises a control flow of the plurality of regeneration phase parameter settings with control statements, so that the application for at least some of the plurality of regeneration phase parameter settings is dependent on a condition evaluation by the control statements, wherein the control flow is a nested control flow so that an execution of the control flow can pass multiple control statements.

14. The method for controlling an adsorption dryer according to claim 1, wherein measuring the ambient value comprises measuring a moisture value and/or a pressure value and/or a temperature value of the upstream compressed gas with a sensor, in particular the upstream compressed gas sensor, arranged upstream of the vessels, that determining the characteristic value comprises determining a water load of the upstream compressed gas, further that the determined regeneration phase parameter setting comprises a specification of the heating phase and/or a stop condition for the end of the regeneration phase dependent on the determined water load.

15. An adsorption dryer for the treatment of compressed gas, the adsorption dryer comprising vessels each housing a desiccant bed and comprising a valve arrangement for selectively feeding upstream compressed gas to the vessels and for selectively outputting dried downstream compressed gas from the vessels, wherein the adsorption dryer comprises a processing apparatus with a main processor and nonvolatile memory, which processing apparatus is configured to control the valve arrangement in the process phase and in the regeneration phase, wherein the valve arrangement is configured to feed the compressed gas to at least one of the vessels in a process phase for drying the compressed gas through liquid adsorption by the desiccant bed and subsequently removing the adsorbed liquid from the desiccant bed in the at least one vessels in a regeneration phase, wherein the adsorption dryer comprises an external sensor arrangement for measuring an ambient value occurring outside the vessels and outside the downstream compressed gas output from the vessels, that the processing apparatus is configured to determine a characteristic value based on the measured ambient value, that the processing apparatus is configured to match the characteristic value to a set of criteria each associated with regeneration phase parameter settings stored in the nonvolatile memory and that the processing apparatus is configured to determine a regeneration phase parameter setting based on the matching of the characteristic value and to apply the determined regeneration phase parameter setting to the regeneration phase for setting a parameter of the regeneration phase.

* * * * *